US010202896B2

(12) United States Patent
Brewer et al.

(10) Patent No.: US 10,202,896 B2
(45) Date of Patent: Feb. 12, 2019

(54) MODULAR POWER PLANT SYSTEM HOUSED WITHIN A CONTAINER TRANSFORMER FOR CONNECTION TO A LOCAL POWER DISTRIBUTION SYSTEM

(71) Applicant: Aruana Energia S/A, Goiania (BR)

(72) Inventors: Brian Ray Brewer, Florianopolis (BR); Robert James McKinnon, Florianopolis (BR)

(73) Assignee: Aruana Energia S/A (BR)

( * ) Notice: Subject to any disclaimer, the term of this patent is extended or adjusted under 35 U.S.C. 154(b) by 503 days.

(21) Appl. No.: 14/396,303

(22) PCT Filed: Feb. 5, 2014

(86) PCT No.: PCT/BR2014/000040
§ 371 (c)(1),
(2) Date: Oct. 22, 2014

(87) PCT Pub. No.: WO2015/070300
PCT Pub. Date: May 21, 2015

(65) Prior Publication Data
US 2016/0369689 A1    Dec. 22, 2016

(30) Foreign Application Priority Data

Nov. 13, 2013    (BR) .......................... 20 20130292678

(51) Int. Cl.
*F02B 63/04*    (2006.01)
*E04H 5/04*    (2006.01)
(Continued)

(52) U.S. Cl.
CPC ............. *F02B 63/042* (2013.01); *E04H 5/04* (2013.01); *H02J 3/381* (2013.01); *H02J 9/066* (2013.01);
(Continued)

(58) Field of Classification Search
CPC .... F02B 63/04; F02B 2063/045; F02B 75/16; F02B 63/042; Y02A 30/62;
(Continued)

(56) References Cited

U.S. PATENT DOCUMENTS 3,602,730 A * 8/1971 Cushing ..................... B63J 3/04
114/72
4,117,342 A * 9/1978 Melley, Jr. ................ B60P 3/00
290/1 A
(Continued)

FOREIGN PATENT DOCUMENTS

| CN | 202373983 U | 8/2012 | |
|---|---|---|---|
| CN | 202749743 U | 2/2013 | |
| WO | WO 2005078882 A1 * | 8/2005 | ............... H02B 7/06 |

OTHER PUBLICATIONS

International Search Report for PCT/BR2014/000040 dated Jul. 7, 2014.
(Continued)

*Primary Examiner* — Tulsidas C Patel
*Assistant Examiner* — Charles Reid, Jr.
(74) *Attorney, Agent, or Firm* — Aldo Noto, Davidson Berquist Jackson & Gowdey, LLP

(57) ABSTRACT

A modular electric power plant housed within a container equipped with a transformer for direct connection to an local power distribution system that can supply energy in remote areas is disclosed. The container provides noise control, and includes a set of units that are interconnected and are capable of generating medium-voltage electric power for supplying a local power distribution system. The units include generator units; a cooling unit; a distribution unit and transformer built-in to a tank for collecting spilled oil. The built-in tanks have double walls for collecting contaminated oil/water installed inside the container base, while air inlets for aiding cooling and at least one pair of fans are provided in the (Continued)

cooling unit compartment. The generator units are powered by gas, diesel, or biodiesel automotive engines. Each generator is connected to an exhaust pipe for gases that is installed on the container upper wall.

20 Claims, 14 Drawing Sheets

(51) Int. Cl.
   *E04H 1/12* (2006.01)
   *H02K 7/18* (2006.01)
   *H02J 3/38* (2006.01)
   *H02J 9/06* (2006.01)

(52) U.S. Cl.
   CPC ... *H02K 7/1815* (2013.01); *E04H 2001/1283* (2013.01); *Y02A 30/62* (2018.01)

(58) Field of Classification Search
   CPC .... E04H 2001/1283; E04H 5/04; H02J 3/381; H02J 9/066; H02K 7/1815
   USPC .......................................................... 290/1 A
   See application file for complete search history.

(56) References Cited

U.S. PATENT DOCUMENTS

| | | | | |
|---|---|---|---|---|
| RE30,229 E | * | 3/1980 | Berman | E04B 1/3483 |
| | | | | 290/1 R |
| 4,921,116 A | * | 5/1990 | Troughton | B65D 1/40 |
| | | | | 220/23.4 |
| 5,517,822 A | * | 5/1996 | Haws | F01K 17/025 |
| | | | | 122/1 R |
| 8,294,285 B2 | * | 10/2012 | Hunter | B60L 8/003 |
| | | | | 290/1 R |
| 9,203,276 B1 | | 12/2015 | McCartney et al. | |
| 2003/0029390 A1 | * | 2/2003 | Campion | F02B 63/04 |
| | | | | 123/2 |
| 2003/0033994 A1 | * | 2/2003 | Campion | F02B 63/04 |
| | | | | 123/41.56 |
| 2007/0096470 A1 | * | 5/2007 | Cole | H02K 7/1853 |
| | | | | 290/1 R |
| 2008/0209918 A1 | * | 9/2008 | White | F17C 5/02 |
| | | | | 62/50.1 |
| 2010/0301672 A1 | * | 12/2010 | Di Cristofaro | H02B 1/52 |
| | | | | 307/39 |
| 2012/0074700 A1 | * | 3/2012 | Ciszak | F03D 15/00 |
| | | | | 290/44 |
| 2012/0102929 A1 | * | 5/2012 | Beissler | F01N 13/00 |
| | | | | 60/297 |
| 2012/0181795 A1 | * | 7/2012 | Lobsiger | F02D 29/06 |
| | | | | 290/1 A |
| 2012/0205005 A1 | * | 8/2012 | White | B01F 13/0233 |
| | | | | 141/311 R |
| 2014/0210214 A1 | * | 7/2014 | Campion | F02B 63/04 |
| | | | | 290/1 A |

OTHER PUBLICATIONS

Brown, Bill, P.E., "Section 4: System Voltage Considerations," accessed on Apr. 4, 2018, 4 pages. Retrieved from: <http://static.schneiderelectric.us/assets/consultingengineer/appguidedocs/section4_0307.pdf>.

* cited by examiner

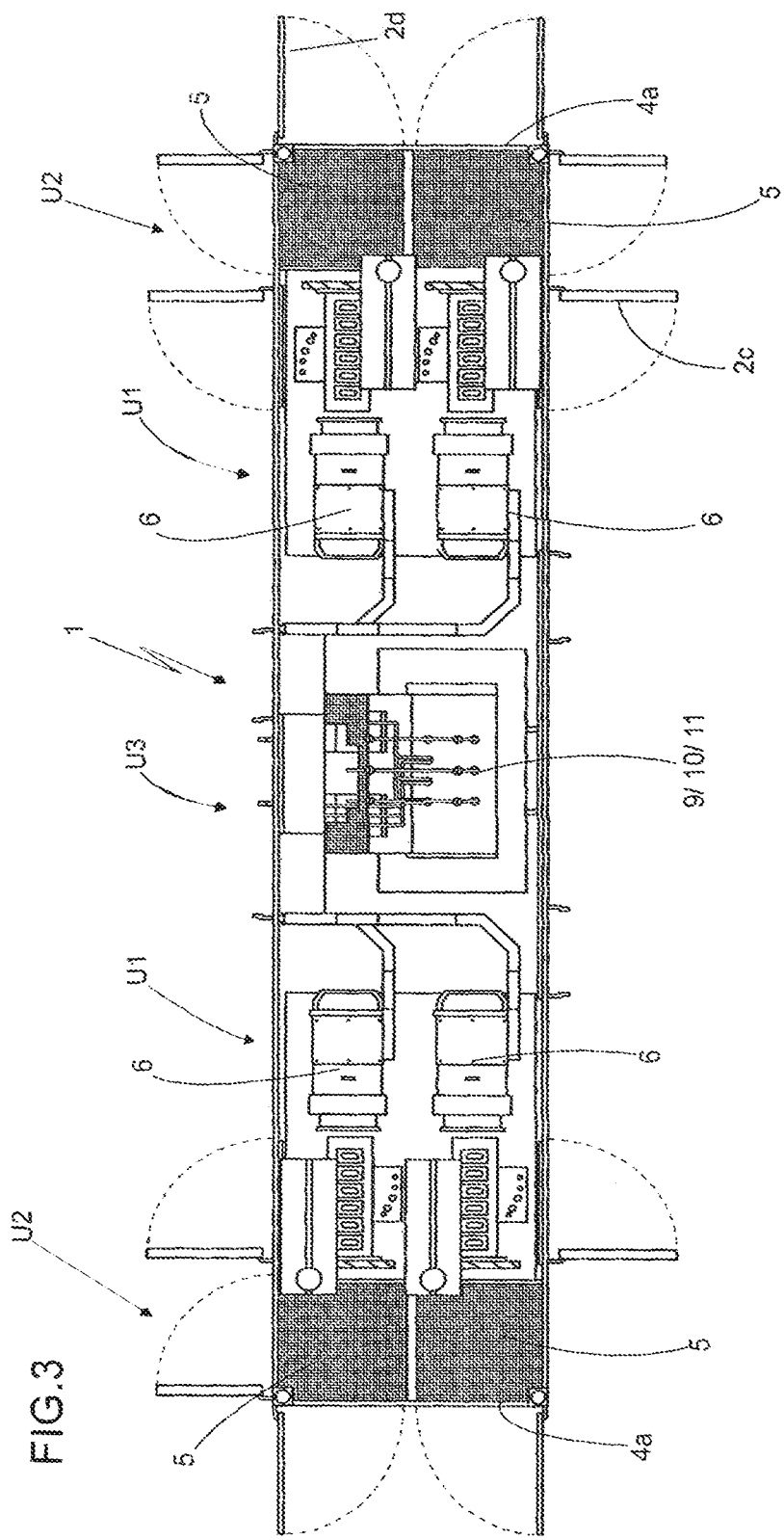

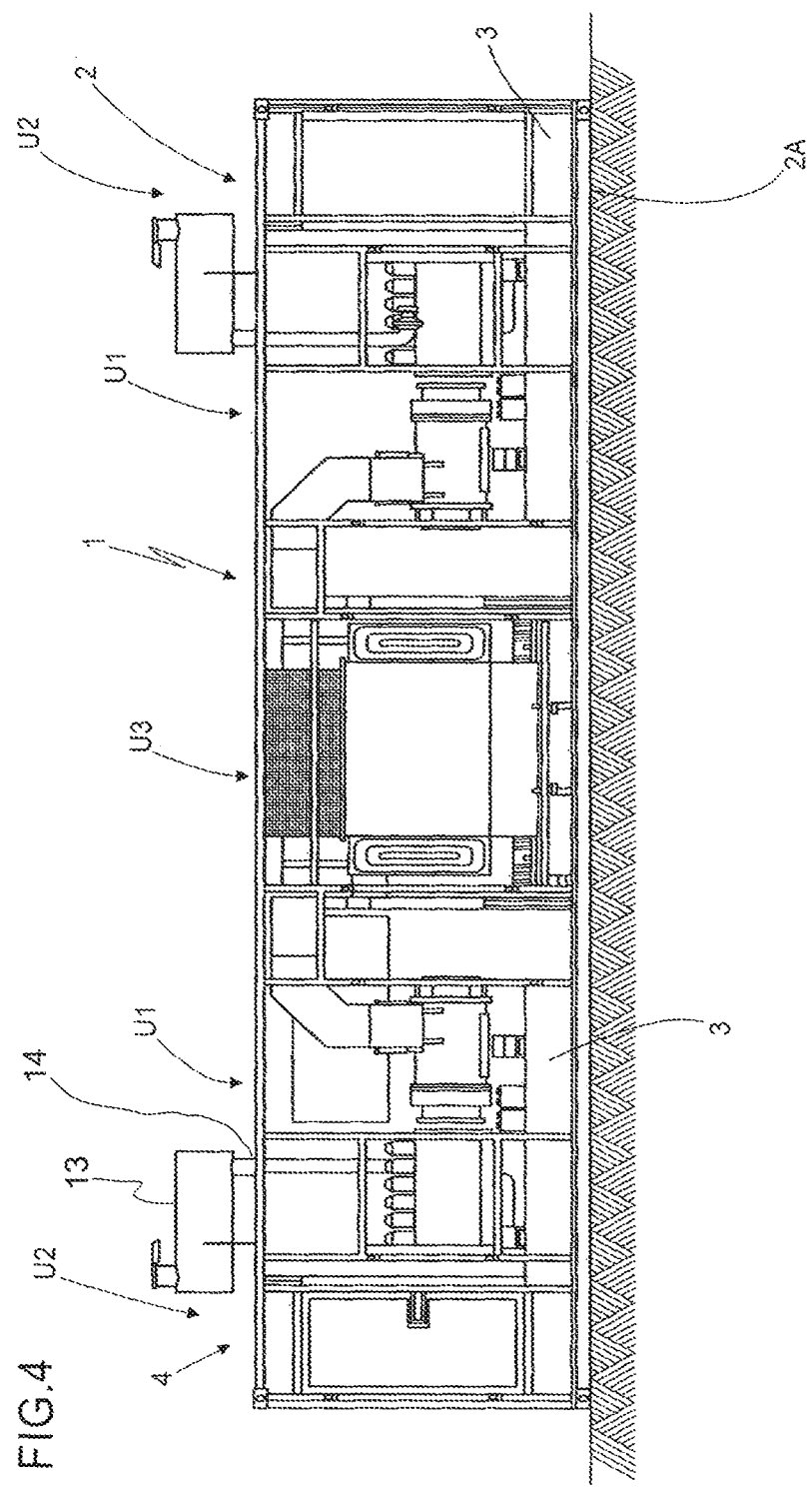

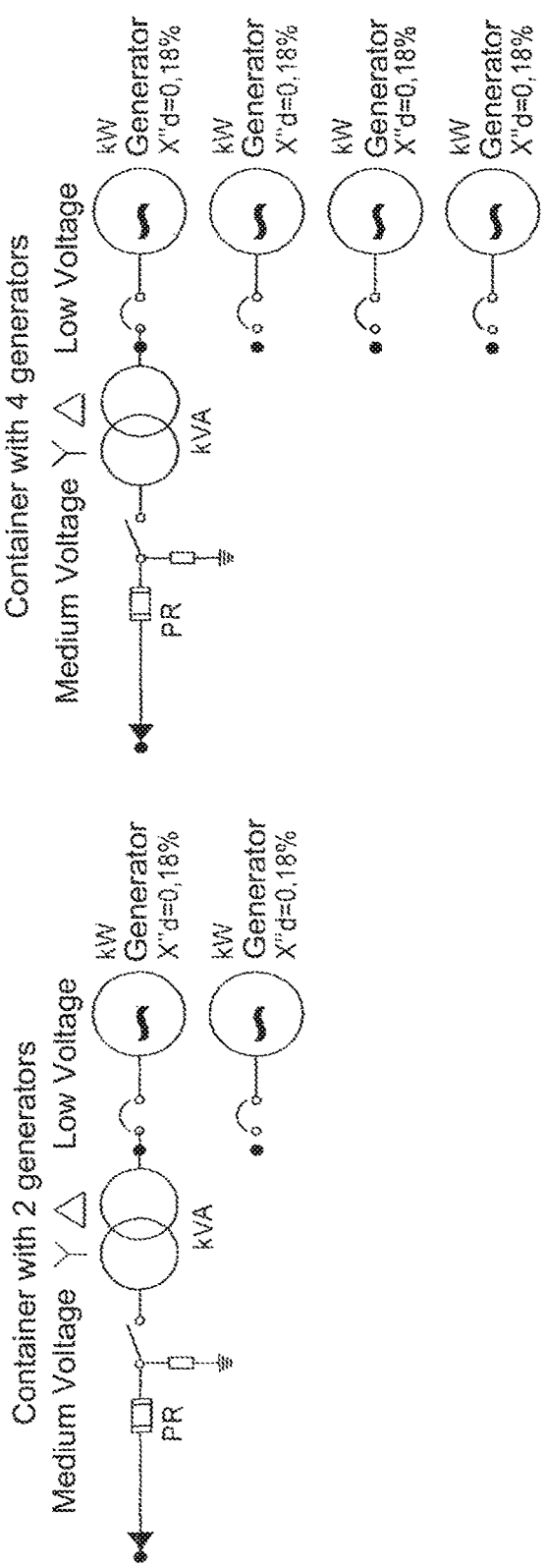

MODULAR POWER PLANT SYSTEM HOUSED WITHIN A CONTAINER TRANSFORMER FOR CONNECTION TO A LOCAL POWER DISTRIBUTION SYSTEM

CROSS REFERENCE TO RELATED APPLICATION(S)

This application is a 371 of PCT/BR2014/000040, filed Feb. 5, 2014, which claims priority from Brazilian Patent Application. No. BR 20 2013 029267 8, filed Nov. 13, 2013, which is hereby incorporated herein by reference in its entirety.

FIELD

The present utility model pertains to an innovative structural arrangement introduced in a modular electric power plant that is equipped with a high-voltage transformer system for direct connection to an energy distribution system housed within ISO containers or similar items. An arrangement of this kind specifically allows direct connection of the aforementioned modular power plant to an energy distribution system, thereby allowing fast and easy installation in remote/isolated areas.

BACKGROUND

It is known that, in many remote areas, such as isolated rural communities, mining sites, petroleum drilling platforms, sites that have been affected by storms, earthquakes, etc., or areas undergoing periods of conflict; there is no conventional energy supply due to difficulties with access for the implementation of power generation plants or, moreover, because of difficulties with restoring operations in isolated locations, hindering the continuation of economic activities as well as the inaccessibility of electrical equipment for hospitals, markets, business establishments, communication networks, inter alia.

Consequently, modular generator systems that facilitate accessibility to electric power basically consisting of containers, canopies, or similar items where engines, generator groups, and refrigeration or cooling systems, along with other devices and pieces of equipment are installed, do exist within the market.

In order to be used, the aforementioned conventional modular generators need additional equipment because they do not include any means of direct connection to energy distribution systems existing at the site requiring the installation of additional equipment and structures, such as step-up transformers, external low voltage and medium cables, fuses, external tanks, oil containers, civil construction, etc. in such a manner that it makes installing the generator module difficult and time-consuming.

Currently, there are companies in the market engaging in the manufacture of modular generators, such as the companies "Gerasol" and "Maquigeral." They use containers for producing generator modules, although, in spite of the fact that these companies offer modular units with as many as four generators, these generators are intended for industrial use, and boosting step-up transformation equipment is needed for operating within distribution systems, which makes using these units for electric power generation in remote locations difficult and time-consuming and requiring other equipment.

By means of a search completed in specialized databanks, documents pertaining to containers equipped with electric power generators were located, such as the documentation for Patent Number PI 0605454-4, where the equipment consists of a main structure made up of a container with an internal platform on which there are two engines with electronic injection systems that are supplied with diesel fuel, pure biodiesel, or biodiesel mixed with diesel fuel, which is stored in a fuel tank located in the rear section, while the bottom portion of the front section contains an electrical panel on which a control panel is located, and the aforementioned container's side sections and front section are outfitted with doors.

The document for Patent Number MU 9002049-9 describes a container with a dual generator group that belongs to the electrical engineering field, and it pertains to equipment intended for generating alternating or direct power and is capable of withstanding various forms of stress, strain, or mechanical and electrical operation, and it is inside of a soundproof container possessing a set of doors with shutters on the four lateral surfaces, in order for air to be admitted, two hot air outlets on smaller edges on the top and two exhaust outlets with a soundproofing box on the top in the center. Inside the container, there are two generator engine groups, and each consists of a combustion engine that is interconnected by an elastic coupling to an electrical generator. The cooling system consists of a horizontal air blower beneath the radiator, which is also horizontal, and an air deflection chamber. Two high-capacity fuel tanks may be located inside or outside the container.

The document pertaining to Patent Number MU 8600241-4 describes a compartment for a motorized generator group, which is produced from a molded polymer "fiberglass" material and includes two counterposed walls with finned molding for ventilation. One of these walls contains two reinforced doors, and the other wall contains operational entry doors, with one of said doors containing an inspection port. Moreover, there is a domed roof with crosswise reinforcing members and front and rear cowling, also with ventilation louvers, with the entire group being supported by a chassis consisting of metal profiles, and it rests upon a flat base to which the combustion engine, which is connected to the electric power generator, is attached and where front and rear attenuating members that respectively support front intake and rear exhaust silencers belonging to the radiator's air inlet are attached, with heat exchanging being allowed between the inner and outer portions of the compartment.

Pursuant to the previously cited documents, it can be noted that the fact that the aforementioned products require additional components for connection to the electric power distribution system is a principal disadvantage, making installation difficult.

As a result, a brief search has revealed that embodiments of the present system described herein are differentiated mainly because they possess characteristics that facilitate application, in addition to the fact that the module possesses a plated non-skid surface providing safety for pedestrians.

SUMMARY

With the intention of offering improvements for the consumer market, the Applicant developed a new structural arrangement introduced as a structural arrangement introduced in a modular electric power plant housed within an ISO shipping container or similar package that is equipped with a high-voltage transformer system for direct connection to an energy distribution system.

The aforementioned modular electric power plant is supplied in a 20 or 40 foot container of the ISO sea cargo type that offers noise control and has subdivisions according to positioning of a set of units that are interconnected and are capable of generating medium voltage electricity, whereby it is possible for said units to be defined as: i) power generation unit; ii) cooling unit; iii) transforming and distributing unit.

The aforementioned container contains air inlets that work with the cooling system, as well as access and inspection doors that facilitate maintenance of the system, such as the replacement of generators via the access doors with each generator being mounted on its respective tracks that also aid in the removal of the generators.

The aforementioned power generation unit may comprise four or two generators that are powered by automotive engines that are fueled by gas, diesel fuel or biodiesel in such a manner as to achieve cost reductions when compared with higher capacity industrial engines, in addition to the fact that each generator possesses a gas outlet installed on the upper part of the container.

The distribution unit possesses protective circuit breakers for the generator groups, low voltage buses, a distribution transformer, and a 13.8 kV, 34.5 kV, 13.2 kV, or 4.16 kV high-voltage circuit breaker for protection, with voltage outlets to be directly connected to the local electric power system.

In addition, the aforementioned plant is outfitted with built-in tanks enclosed within a double wall. These tanks are installed in the bottom portion of the container, and they allow collection of contaminated oil/water, and, consequently, elimination of structural components for containing these pollutants.

The principal advantage arises from the fact that the aforementioned modular electric power plant does not require additional auxiliary equipment for connection to the energy distribution system making this plant easy and quick to install in any remote location or area.

Another advantage arises from the fact that the plant is composed of multiple units to allow improved operation of each group, such as, for example starting and/or turning off motors according to load variations whereby the improved plant can operate at maximum efficiency with loads representing 25%, 50%, 75%, and 100% of its rated load, so that this plant differs from larger generator groups that operate efficiently when at least 80% of the mechanical load is provided.

Another advantage arises from the fact that the aforementioned modular plant can be installed without civil construction, reducing labor and material costs.

Another advantage arises from the fact that the aforementioned modular electric power plant basically allows maritime, overland, or river transportation, making transportation to any location feasible.

BRIEF DESCRIPTION OF THE DRAWINGS

The detailed description will refer to the following drawings, wherein like numerals refer to like elements, and wherein:

FIG. 3 portrays a top view of the modular electric power plant mounted in a container structure;

FIG. 4 shows a side view of the modular electric power plant;

FIGS. 5 and 6 present single-wire electrical diagrams for a power plant with two or four generators;

DETAILED DESCRIPTION

In reference to the illustrative drawings, embodiments pertain to a structural arrangement introduced in a modular electric power plant housed within an ISO shipping container or similar package that is equipped with a high-voltage transformer system for direct connection to an energy distribution system, and more specifically pertain to a modular electric power plant 1 of the type that is used for supplying energy in remote areas, such as isolated rural communities, mining sites, petroleum drilling platforms, sites that have been affected by storms, earthquakes, etc., or areas where there are no conventional supply of electric power.

Figure 1:
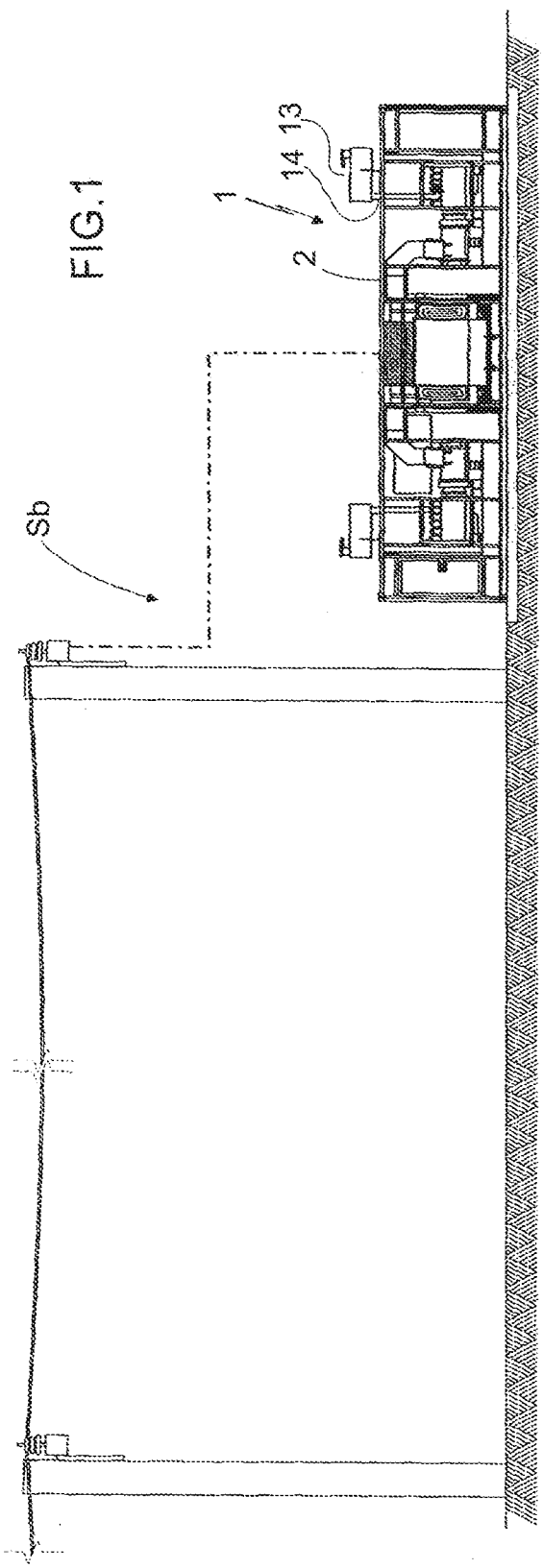
FIG. 1 provides a schematic view of the energy distribution grid connection connected to the modular electric power plant.
Figure 2:
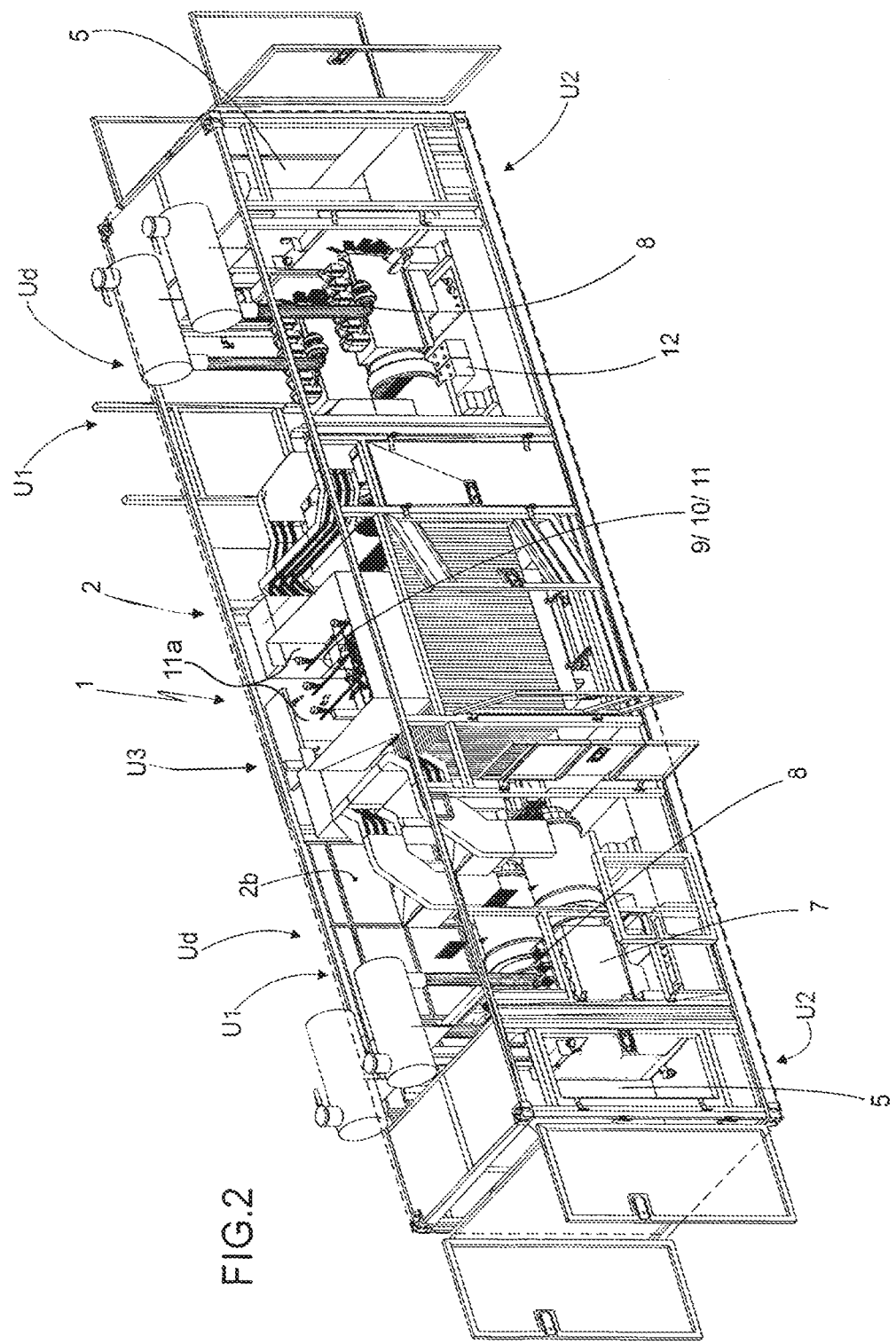
FIG. 2 shows a perspective view of an example of assembly of an improved power plant with four generators with engine driven radiator fans.
Figure 7A:
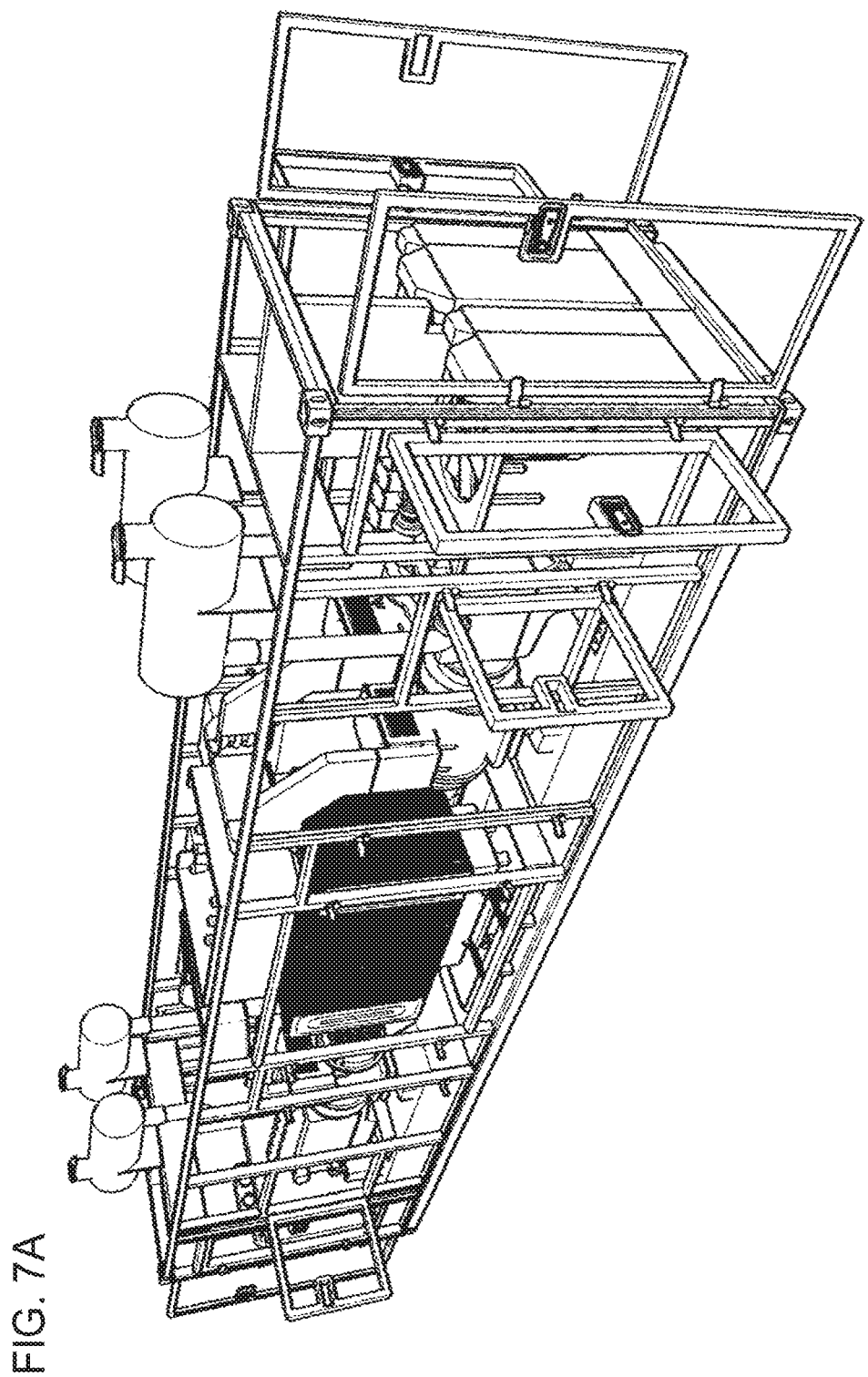
FIGS. 7A, 7B, 7C, 7D, 7E, and 7F show, in perspective, top, side, and rear views of a second version of a set-up of a power plant with four generators with motor-driven radiator fans.
Figure 7B:
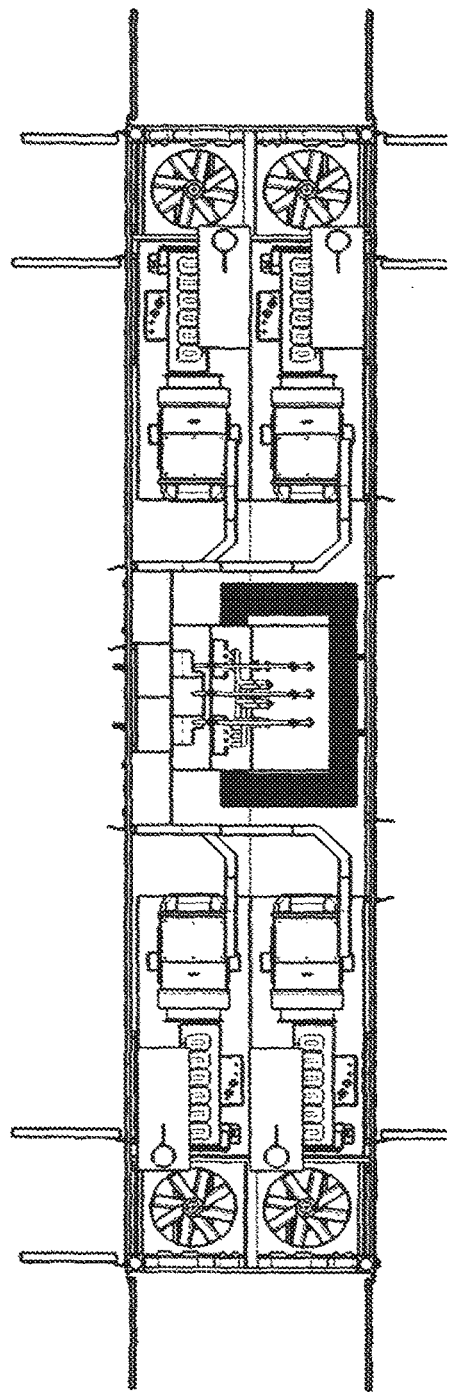
Figure 7C:
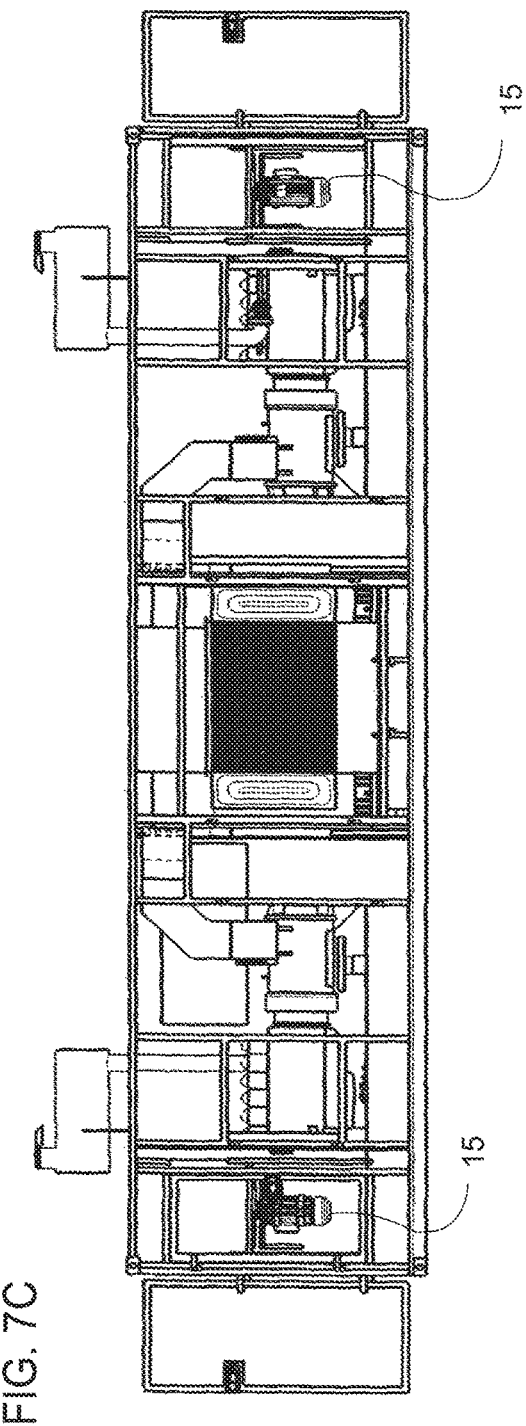
Figure 7D:
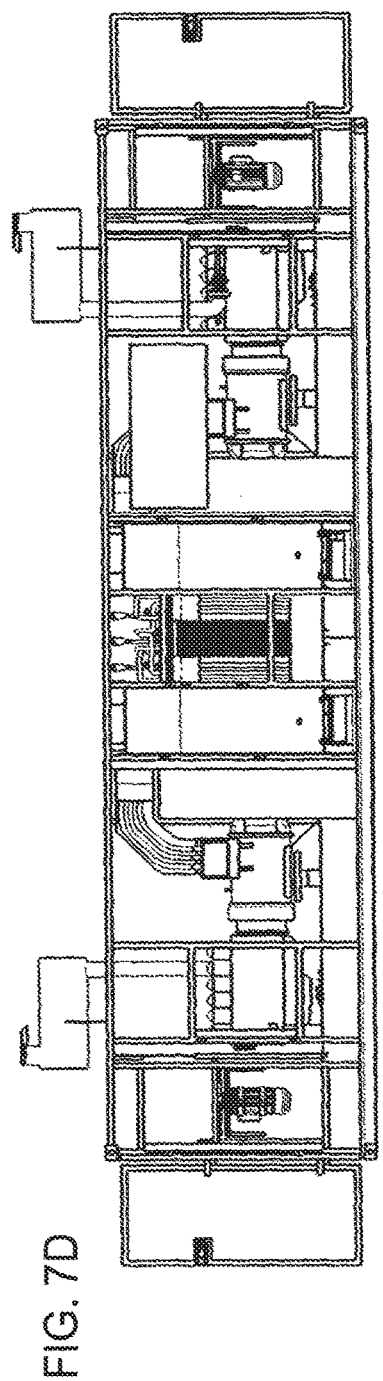
Figure 7F:
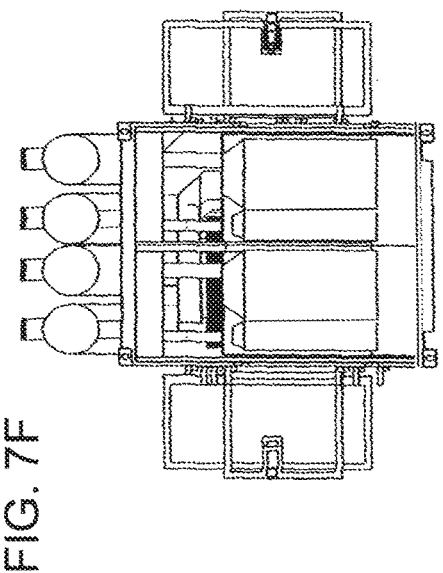
Figure 7E:
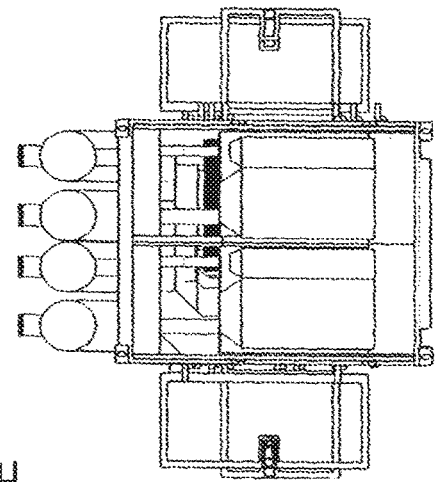
Figure 8A:
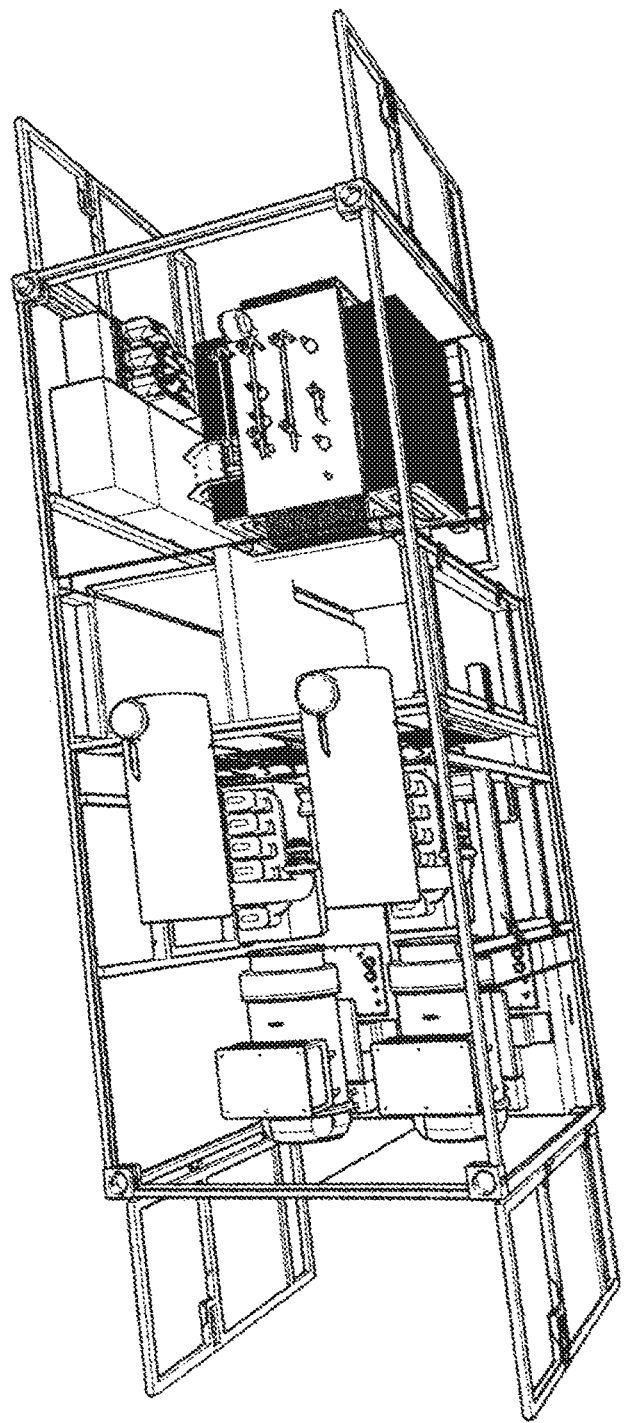
FIGS. 8A, 8B, 8C, 8D, 8E, and 8F show, in perspective, top, side, front, and rear views of a third version of a set-up of a power plant with two generators with engine driven radiator fans.
Figure 8B:
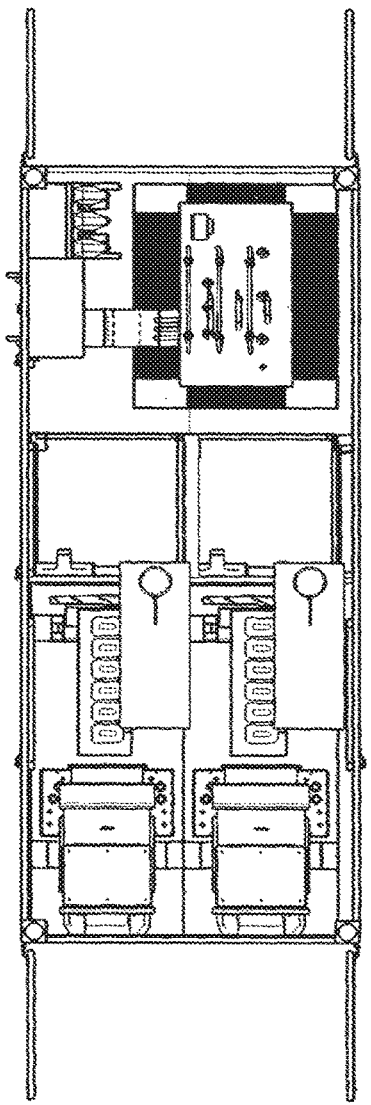
Figure 8C:
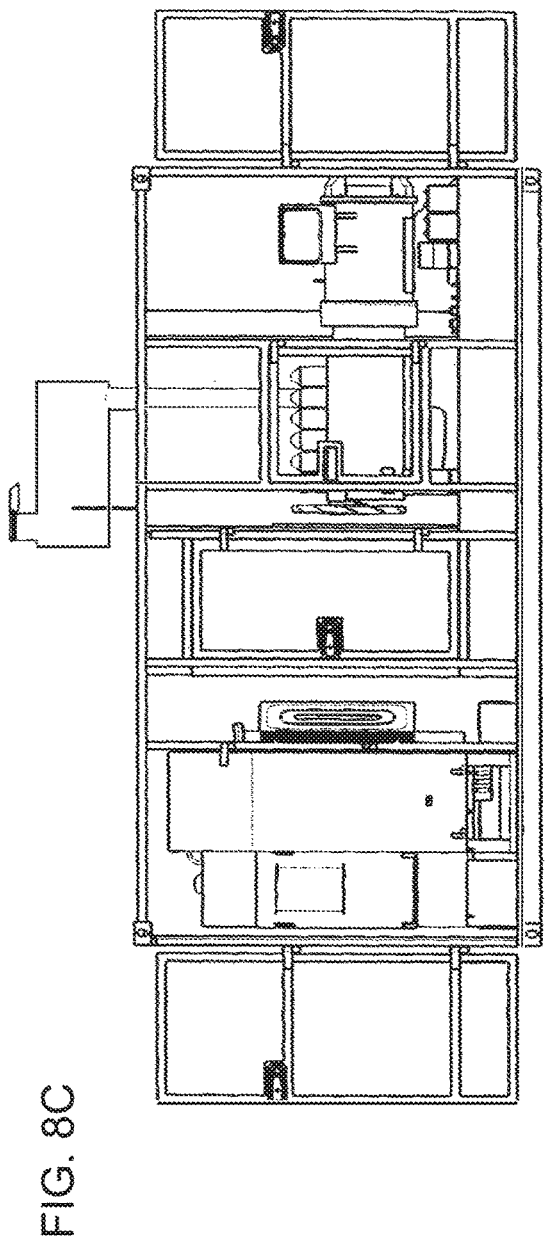
Figure 8D:
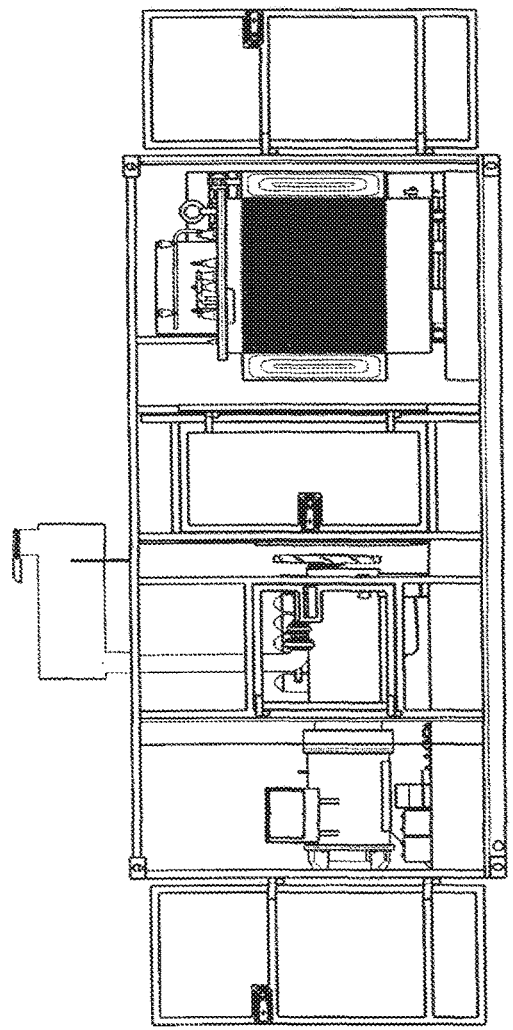
Figure 8F:
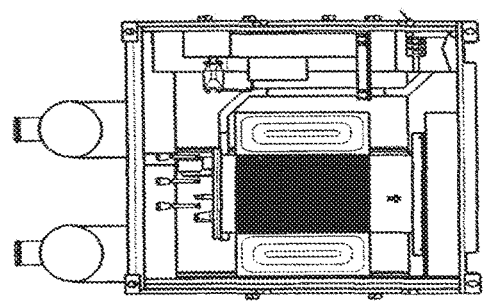
Figure 8E:
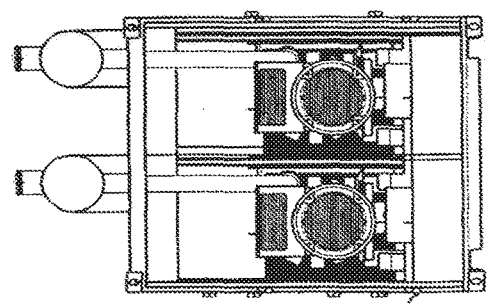
Figure 9A:
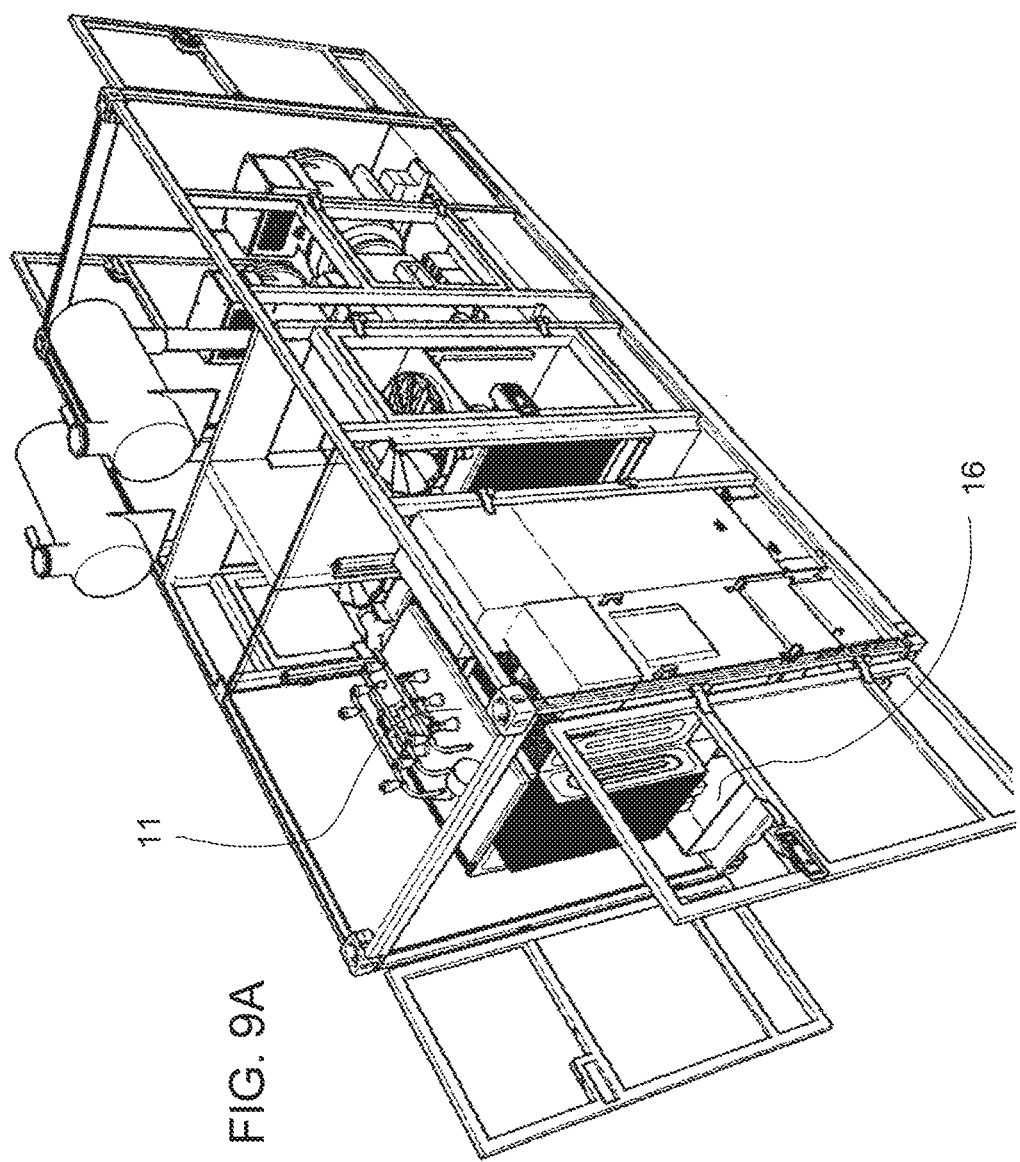
FIGS. 9A, 9B, 9C, 9D, 9E, and 9F show in perspective top, side, front, and rear views of a fourth structural version of a set-up of a power plant with two generators with motor-driven propellers.
Figure 9B:
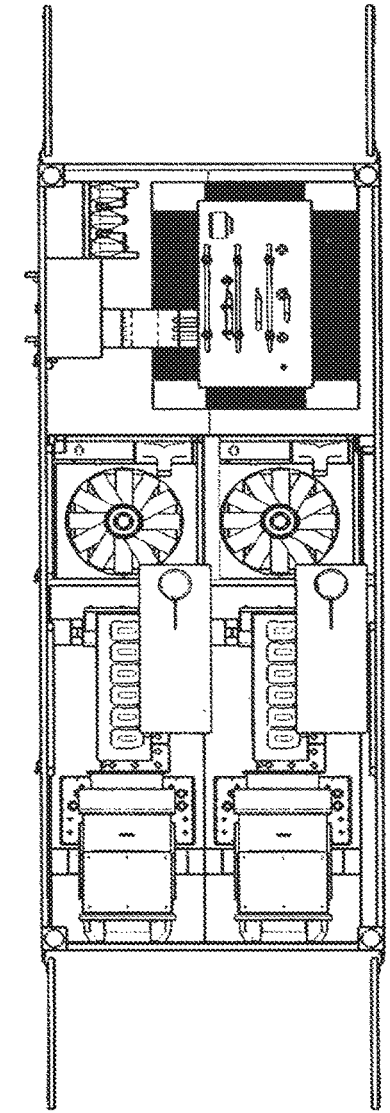
Figure 9C:
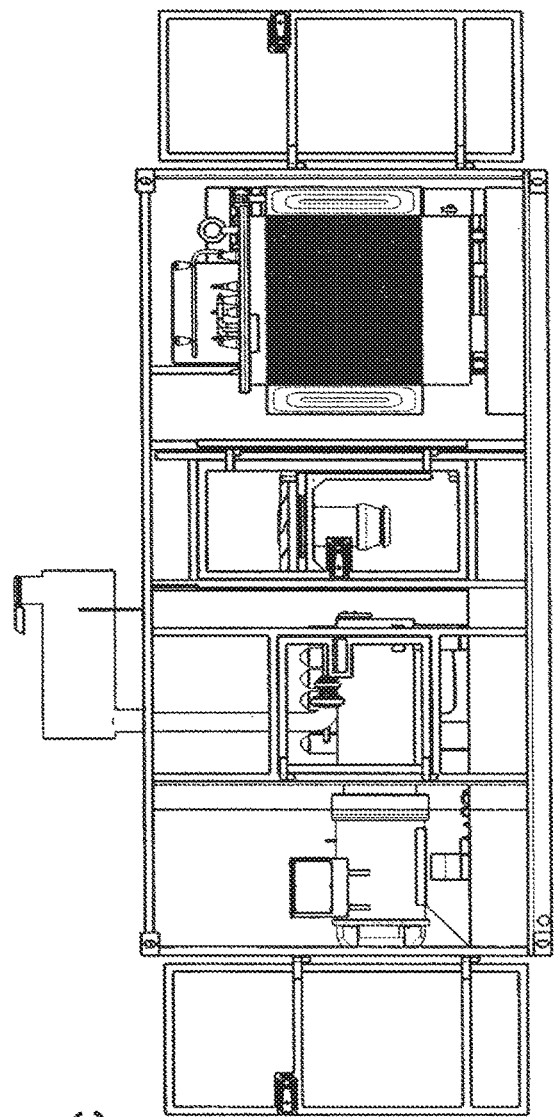
Figure 9D:
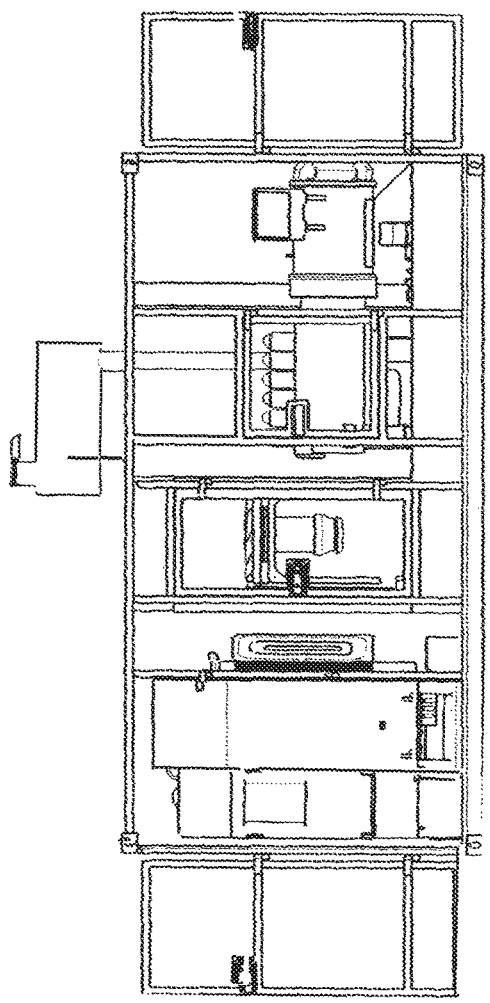
Figure 9F:
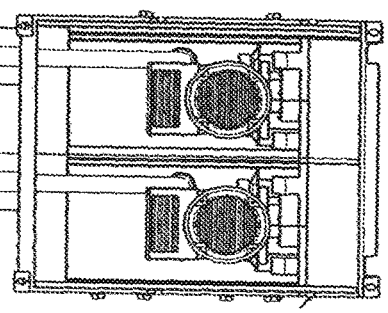
Figure 9E:
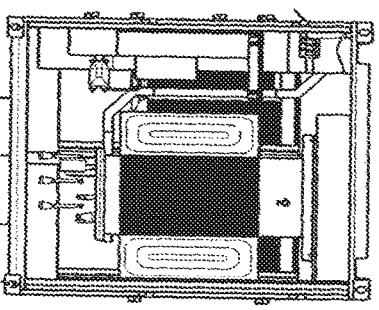

According to embodiments and with reference to FIGS. 1-9F, the aforementioned modular electric power plant 1 is supplied in a container 2 that is 20 to 40 feet long of the ISO maritime type with a noise control, for example muffler 13 connected to exhaust gas outlet 14, and configured with a set of units Ud that are interconnected and are capable of generating medium voltage electrical power for supplying a local energy distribution system Sb, with said units being defined as: i) generator units U1; ii) a cooling unit U2; and iii) a distribution unit and transformer U3. Built-in tanks 3 enclosed within double walls are installed inside the base 2A of the container 2 for receiving contaminated oil/water, while air inlets 4a to aid cooling and at least one pair of fans 5 are installed in the compartment 4 making up the cooling unit U2.

The aforementioned generator units U1 may include four or two generators 6 that are, in turn, powered by automotive engines 7, with each engine 7 being connected to an exhaust pipe 8 for gases that is installed on the upper wall 2b of the container 2.

The generator units U1 are adjacent to the distribution unit and transformer U3 that is mounted inside a retention tank 16 for insulating oil and includes protective circuit breakers 9 for the generator groups 6, low-voltage buses 10, and a 13.8 kV, 34.5 kV, 13.2 kV or 4.16 kV distribution transformer 11 with a voltage outlet 11a, with said items being directly connected to the distribution grid Sb by means of their high-voltage protective circuit breakers 9.

According to a preferred structural embodiment, the aforementioned container 2 possesses access 2c and inspection 2d doors situated in the generator units U1 and cooling unit U2 for maintenance of the plant 1. The respective tracks 12 situated in the unit U1 are also provided to support the generators.

Units U1, U2, and U3 in the container 2 may be configured in the following manner:

a) 04—four—generators 6 in the generator unit U1 in a 40-foot container with ventilation by means of an electrical motor 15 in the cooling unit U2, and a distribution and transformer unit U3;

b) 04—four—generators 6 in the generator unit U1 in a 40-foot container with coupled ventilation via a gas, diesel, or biodiesel motor in the cooling unit U2 and a distribution and transformer unit U3;

c) 02—two—generators 6 in the generator unit U1 in a 20-foot container with ventilation by means of an electric motor 15 in the cooling unit U2, and a distribution and transformer unit U3; or d) 02—two—generators 6 in the generator unit U1 in a 20-foot container with coupled ventilation via a gas, diesel, or biodiesel motor in the cooling unit U2, and a distribution and transformer unit U3.

The three-dimensional modular electric power plant therefore provides significant advantages over the devices defining the state of the art that are mentioned in the Background section above.

A preferred version of an embodiment was described, although any modifications and/or alterations are to be understood as being within the scope of the below claims.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

What is claimed is:

1. A modular power plant system for supplying electricity to a local power distribution system, the modular power plant system comprising:
    a container that houses a modular power plant,
    the modular power plant including
        a generator unit,
        a cooling unit, and
        a distribution and transformer unit;
    the generator unit including
        at least one engine and
        at least one generator coupled to the at least one engine to produce a low-voltage electricity at a nominal voltage of 600 V or below;
    the cooling unit including
        at least one air inlet for aiding cooling and
        at least one fan;
    the distribution and transformer unit including
        a distribution transformer to receive the low-voltage electricity from the generator unit, convert the low-voltage electricity into a medium-voltage electricity at a nominal voltage above 600 V and below 115 kV, and supply the medium-voltage electricity to at least one voltage outlet,
    wherein the modular power plant fits inside an interior volume bounded by the container, and
    wherein the generator unit, the cooling unit, and the distribution and transformer unit are interconnected to operate inside the container to generate and supply the medium-voltage electricity to the at least one voltage outlet.

2. The modular power plant system of claim 1, wherein the generator unit includes four generators, the container is a 40-foot container, and the cooling unit includes an electric motor to drive the at least one fan which provides ventilation for the container.

3. The modular power plant system of claim 1, wherein the generator unit includes four generators, the container is a 40-foot container, and the at least one engine is powered by at least one of gas, diesel, and biodiesel to drive the at least one fan which provides ventilation for the container.

4. The modular power plant system of claim 1, wherein the generator unit includes two generators, the container is a 20-foot container, and the cooling unit includes an electric motor to drive the at least one fan which provides ventilation for the container.

5. The modular power plant system of claim 1, wherein the generator unit includes two generators, the container is a 20-foot container, and the at least one engine is powered by at least one of gas, diesel, and biodiesel to drive the at least one fan which provides ventilation for the container.

6. The modular power plant system of claim 1, wherein the container is an ISO shipping container.

7. The modular power plant system of claim 6, further comprising:
    a muffler to control a noise of an exhaust gas outlet of the modular power plant.

8. The modular power plant system of claim 1, wherein the at least one engine is an automotive engine.

9. The modular power plant system of claim 1, wherein the at least one engine is connected to an exhaust pipe for gases that is installed on an upper wall of the container.

10. The modular power plant system of claim 1, wherein the distribution transformer includes an insulating oil to insulate the distribution transformer; and
    the distribution transformer is mounted in a retention tank that retains the insulating oil around the distribution transformer to limit the insulating oil from flowing out of the distribution and transformer unit.

11. The modular power plant system of claim 10 wherein the generator unit is adjacent to the distribution and transformer unit.

12. The modular power plant system of claim 1, wherein the container includes access and inspection doors for maintenance of the modular power plant.

13. The modular power plant system of claim 1, wherein the modular power plant includes at least two engines, the container includes an individual muffler for each of the at least two engines to control noise, an individual exhaust pipe connects each of the at least two engines to a corresponding muffler, and each of the mufflers connects to an individually corresponding exhaust gas outlet on an upper wall that delimits a maximum interior height of the container.

14. The modular power plant system of claim 1, wherein the generator unit includes four generators, a first two of the four generators are adjacent to a first side of the distribution and transformer unit and a second two of the four generators are adjacent to a second side opposite the first side of the distribution and transformer unit.

15. The modular power plant system of claim 1, wherein the container includes a base,
    an upper wall elevated above the base, the upper wall delimiting a maximum interior height of the container, first and second side walls connecting the base to the upper wall and extending between proximal and distal ends of the container,
a front wall on the proximal end of the container, and
a rear wall on the distal end of the container; and
at least one built-in tank integral to the base.

16. The modular power plant system of claim 15, wherein the at least one air inlet is disposed in one of the front and rear walls, and
at least one exhaust gas outlet is disposed on the upper wall.

17. The modular power plant system of claim 15, further comprising:
tracks that support the at least one generator inside the container, wherein
the tracks rest on the base, and the at least one built-in tank collects at least one of contaminated oil and contaminated water below the generator.

18. The modular power plant system of claim 15, wherein the at least one built-in tank includes
a first built-in tank disposed directly below the generator unit and
a second built-in tank separate from the first built-in tank and disposed directly below the cooling unit.

19. A modular power plant system for supplying electricity to a local power distribution system, the modular power plant system comprising:
a container that houses a modular power plant,
the modular power plant including
a generator unit,
a cooling unit, and
a distribution and transformer unit;
the generator unit including
at least one engine and
at least one generator coupled to the at least one engine to produce a low-voltage electricity;
the cooling unit including
at least one air inlet for aiding cooling and
at least one fan;
the distribution and transformer unit including
at least one voltage outlet to supply a medium-voltage electricity and
a distribution transformer to receive the low-voltage electricity from the generator unit, convert the low-voltage electricity into the medium-voltage electricity, and supply the medium-voltage electricity to the at least one voltage outlet,
wherein the modular power plant fits inside an interior volume bounded by the container,
wherein the generator unit, the cooling unit, and the distribution and transformer unit are interconnected to operate inside the container to generate and supply the medium-voltage electricity to the at least one voltage outlet,
wherein the distribution and transformer unit further includes
a high-voltage protective circuit breaker and
at least one low-voltage bus between the generator unit and the at least one distribution transformer, and
wherein the medium voltage is 31.8 kV, 34.5 kV, 13.2 kV, or 4.16 kV, and
the distribution and transformer unit is directly connected to the local power distribution system via the high-voltage protective circuit breaker.

20. The modular power plant system of claim 19 wherein the modular power plant includes at least two generators each separately connected by a corresponding circuit breaker to the at least one low-voltage bus.

* * * * *